United States Patent
Matsunaga et al.

(10) Patent No.: US 10,751,820 B2
(45) Date of Patent: Aug. 25, 2020

(54) WIRE ELECTRICAL DISCHARGE MACHINE WITH DETERIORATION DETECTION FUNCTION FOR FEEDER

(71) Applicant: FANUC Corporation, Yamanashi (JP)

(72) Inventors: Tomoaki Matsunaga, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 502 days.

(21) Appl. No.: 15/394,943

(22) Filed: Dec. 30, 2016

(65) Prior Publication Data

US 2017/0197267 A1 Jul. 13, 2017

(30) Foreign Application Priority Data

Jan. 7, 2016 (JP) .................................. 2016-001583

(51) Int. Cl.
*B23H 1/04* (2006.01)
*B23H 1/02* (2006.01)
*B23H 7/04* (2006.01)
*B23H 11/00* (2006.01)

(52) U.S. Cl.
CPC ............. *B23H 1/024* (2013.01); *B23H 1/026* (2013.01); *B23H 7/04* (2013.01); *B23H 11/00* (2013.01)

(58) Field of Classification Search
CPC .......... B23H 1/02; B23H 1/024; B23H 1/026; B23H 7/04; B23H 11/00; B23H 11/006; G01R 19/00; G01R 19/0084; G01R 21/00
See application file for complete search history.

(56) References Cited

U.S. PATENT DOCUMENTS

| | | | | |
|---|---|---|---|---|
| 4,892,989 A * | 1/1990 | Itoh | ................. | B23H 1/024 |
| | | | | 219/69.13 |
| 5,081,332 A * | 1/1992 | Sakuragawa | ............ | B23H 1/10 |
| | | | | 219/69.13 |
| 5,233,147 A * | 8/1993 | Magara | .................. | B82Y 15/00 |
| | | | | 219/69.12 |

(Continued)

FOREIGN PATENT DOCUMENTS

| | | | | |
|---|---|---|---|---|
| CN | 103648699 A | | 3/2014 | |
| EP | 2158993 A2 * | | 3/2010 | ............... B23H 1/02 |

(Continued)

OTHER PUBLICATIONS

Notice of Allowance in JP Application No. 2016-001583, dated May 8, 2018, 6pp.
Office Action in JP Application No. 2016-001583, dated Dec. 19, 2017, 4 pp.
Extended European Search Report in EP Application No. 16207076.7, dated Jun. 6, 2017.
Office Action in CN Application No. 201710010096.3, dated Jan. 4, 2019, 5pp.

(Continued)

*Primary Examiner* — Dana Ross
*Assistant Examiner* — Lawrence H Samuels
(74) *Attorney, Agent, or Firm* — Hauptman Ham, LLP

(57) ABSTRACT

A wire electrical discharge machine is configured to perform removal machining of a workpiece by applying a voltage to a machining gap between a wire electrode and the workpiece through a feeder to generate electrical discharge and is provided with a feeder deterioration detection unit configured to detect deterioration of the feeder. The feeder deterioration detection unit includes a detection unit configured to detect a machining current value during the machining and a detection unit configured to detect the number of electrical discharges during the machining.

6 Claims, 5 Drawing Sheets

(56) References Cited

U.S. PATENT DOCUMENTS

| | | | | |
|---|---|---|---|---|
| 8,415,581 B2* | 4/2013 | Ukai | ............... | B23H 1/022 |
| | | | | 219/69.13 |
| 10,259,062 B2* | 4/2019 | Tee | ............... | B23H 1/022 |
| 2009/0120911 A1* | 5/2009 | Kawahara | ............... | B23H 7/02 |
| | | | | 219/69.11 |
| 2009/0287426 A1* | 11/2009 | Kukowski | ............... | G01R 31/58 |
| | | | | 702/35 |
| 2010/0320173 A1* | 12/2010 | Ukai | ............... | B23H 1/022 |
| | | | | 219/69.13 |
| 2013/0140276 A1* | 6/2013 | Morita | ............... | B23H 1/024 |
| | | | | 219/69.13 |
| 2013/0193112 A1* | 8/2013 | Murai | ............... | B23H 1/024 |
| | | | | 219/69.12 |
| 2014/0144885 A1 | 5/2014 | Onodera et al. | | |
| 2014/0332503 A1* | 11/2014 | Itokazu | ............... | B23H 7/06 |
| | | | | 219/69.12 |
| 2015/0360310 A1* | 12/2015 | Tee | ............... | B23H 1/022 |
| | | | | 219/69.16 |

FOREIGN PATENT DOCUMENTS

| | | | | |
|---|---|---|---|---|
| EP | 2158993 A2 | 3/2010 | | |
| JP | H5-12044 A | 1/1993 | | |
| JP | H5-12044 U | 2/1993 | | |
| JP | H5-200627 A | 8/1993 | | |
| JP | 5-305520 A | 11/1993 | | |
| JP | H0691433 A * | 2/1994 | ............... | B23H 7/04 |
| JP | H7-178622 A | 7/1995 | | |
| JP | 10-69989 A | 3/1998 | | |
| JP | 2010052092 A | 3/2010 | | |
| JP | 2015-21923 A | 2/2015 | | |

OTHER PUBLICATIONS

Decision for Grant of Patent in KR Application No. 10-2017-0001798, dated Mar. 17, 2019, 3pp.

Office Action in KR Application No. 10-2017-0001798, dated Dec. 6, 2018, 8pp.

* cited by examiner

WIRE ELECTRICAL DISCHARGE MACHINE WITH DETERIORATION DETECTION FUNCTION FOR FEEDER

RELATED APPLICATIONS

The present application claims priority to Japanese Patent Application Number 2016-001583, filed Jan. 7, 2016, the disclosure of which is hereby incorporated by reference herein in its entirety.

BACKGROUND OF THE INVENTION

Field of the Invention

The present invention relates to a wire electrical discharge machine capable of detecting deterioration of a feeder.

Description of the Related Art

In a wire electrical discharge machine for wire electrical discharge machining, as described in Japanese Patent Application Laid-Open No. 2010-52092, for example, a feeder is used to apply a voltage from a machining power supply to a machining gap between a wire electrode and a workpiece to generate electrical discharge, thereby machining the workpiece.

FIG. 7 is a schematic configuration diagram of a conventional wire electrical discharge machine.

A wire electrical discharge machine 10 performs electrical discharge machining by applying a voltage from a machining power supply 6 to a wire electrode 2 and a workpiece 4 on a table 3 through a feeder 5, in a machining tank 1. The machining power supply 6 comprises a resistive element 7, switching element 8, and DC power supply 9.

In the wire electrical discharge machine 10, as shown in FIG. 7, the feeder 5 is connected to the wire electrode 2 and the table 3 in the machining tank 1 and immersed in a working fluid, so that it may be deteriorated or broken by aging due to corrosion or the like. If the feeder 5 is deteriorated or broken, the machining gap between the wire electrode 2 and the workpiece 4 cannot be normally charged with energy, resulting in a reduction in the machining speed and a false result of machining. Thus, it is important to detect the deterioration or breakage at an early stage.

SUMMARY OF THE INVENTION

Accordingly, the object of the present invention is to provide a wire electrical discharge machine capable of detecting a deteriorated state of a feeder at an early stage.

A wire electrical discharge machine according to the present invention is configured to perform removal machining of a workpiece by applying a voltage to a machining gap between a wire electrode and the workpiece through a feeder to generate electrical discharge and comprises a feeder deterioration detection unit configured to detect deterioration of the feeder.

The feeder deterioration detection unit configured to detect deterioration of the feeder may comprise a storage unit in which a data table loaded with a current value for each electrical discharge is stored, a machining current detection unit configured to detect a machining current value during the machining, and a discharge frequency detection unit configured to detect the number of electrical discharges during the machining. And the deterioration of the feeder may be detected based on the result of comparison between the machining current value detected by the machining current detection unit and the product of the number of electrical discharges detected by the discharge frequency detection unit and the current value for each electrical discharge loaded in the data table.

The feeder deterioration detection unit configured to detect deterioration of the feeder may comprise a resistance voltage detection unit configured to detect an inclination of a voltage applied to a resistor connected in series with the machining gap and the feeder, and a storage unit in which a data table preloaded with a reference value for the inclination of the voltage applied to the resistor is stored. And the deterioration of the feeder may be detected if the inclination of the voltage applied to the resistor, which is detected by the resistance voltage detection unit when the voltage is applied with the machining gap short-circuited, is smaller than the reference value loaded in the data table.

The wire electrical discharge machine may be configured to issue a warning if the deterioration of the feeder is detected by the feeder deterioration detection unit.

According to the present invention, deterioration of a feeder can be detected to prevent production of defective workpieces.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
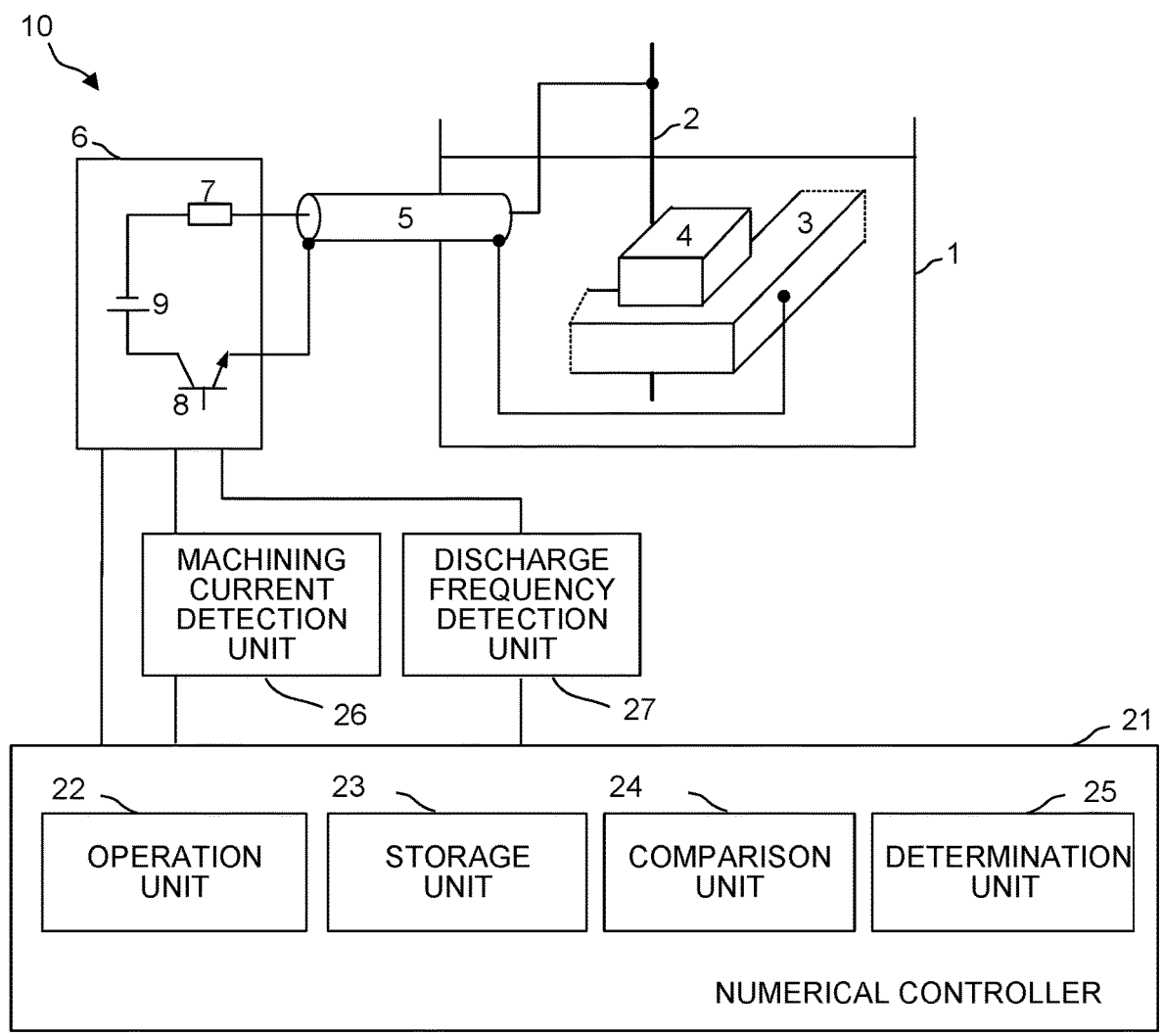
FIG. 1 is a schematic configuration diagram of a wire electrical discharge machine according to a first embodiment of the present invention.

Embodiments of the present invention will now be described with reference to the accompanying drawings. The same reference numerals are used to designate those components which are identical or similar to their conventional counterparts.

FIG. 1 is a schematic configuration diagram of a wire electrical discharge machine according to a first embodiment of the present invention.

Figure 7:
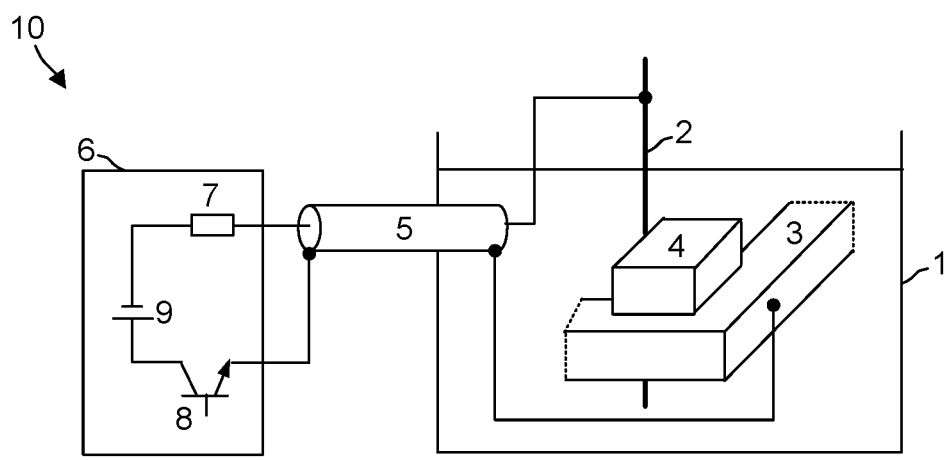
FIG. 7 is a schematic configuration diagram of a conventional wire electrical discharge machine.

A wire electrical discharge machine 10 of the present embodiment is an equivalent of the prior art wire electrical discharge machine 10 shown in FIG. 7 to which a numerical controller 21, machining current detection unit 26, and discharge frequency detection unit 27 are added. The numerical controller 21 comprises an operation unit 22, storage unit 23, comparison unit 24, and determination unit

25. In the present embodiment, the numerical controller 21, machining current detection unit 26, and discharge frequency detection unit 27 constitute a feeder deterioration detection unit.

The wire electrical discharge machine 10 of the present embodiment, like the conventional one, performs electrical discharge machining by applying a voltage from a machining power supply 6 to a wire electrode 2 and a workpiece 4 on a table 3 through a feeder 5, in a machining tank 1. The machining power supply 6 comprises a resistive element 7, switching element 8, and DC power supply 9.

The machining current detection unit 26 detects an average machining current I, which is an average of machining currents output from the machining power supply 6 during the electrical discharge machining. The discharge frequency detection unit 27 detects a discharge frequency N, which is the number of electrical discharges generated in a machining gap between the wire electrode 2 and the workpiece 4 during the electrical discharge machining, based on the change of the voltage output from the machining power supply 6. The detection of the average machining current I by the machining current detection unit 26 and the detection of the discharge frequency N by the discharge frequency detection unit 27 are performed during a predetermined time t1, and the result of the detection is output to the numerical controller 21.

In the storage unit 23 of the numerical controller 21, a data table is loaded with data obtained by associating machining conditions with a reference current $I_s$ as a current value for each electrical discharge during machining under those machining conditions. The operation unit 22 calculates an integral value $I_{t1}$ of a current having flowed through the feeder 5 during the predetermined time t1, based on the average machining current I detected during the predetermined time t1 by the machining current detection unit 26, by expression (1) as follows:

$$I_{t1} = \int_0^{t1} I dt \quad (1)$$

The comparison unit 24 performs comparison using the following expression (2), based on the current integral value $I_{t1}$ calculated by the operation unit 22, the discharge frequency N detected by the discharge frequency detection unit 27, and the reference current $I_s$ corresponding to the machining conditions at the time of detection of the values loaded in the data table stored in the storage unit 23. Note that A in expression (2) is a value of margin provided to the range of determination, to which about 10 percent of the product of the discharge frequency N and the reference current $I_s$ is given.

$$N \times I_s - A < I_{t1} < N \times I_s + A \quad (2)$$

The determination unit 25 determines that the feeder 5 is not abnormal if expression (2) holds so that the machining current (current integral value $I_{t1}$) is determined to be substantially equal to the product of the discharge frequency N and the reference current $I_s$. Moreover, if expression (2) does not holds so that the machining current (current integral value $I_{t1}$) is determined to be deviated from the product of the discharge frequency N and the reference current $I_s$, the resistance and inductance values of the feeder 5 can be assumed to be increased. Therefore, the feeder 5 is determined to be abnormal and a warning to this effect is issued.

The numerical controller 21 repeatedly performs processing for the above-described determination during the machining.

Figure 2:
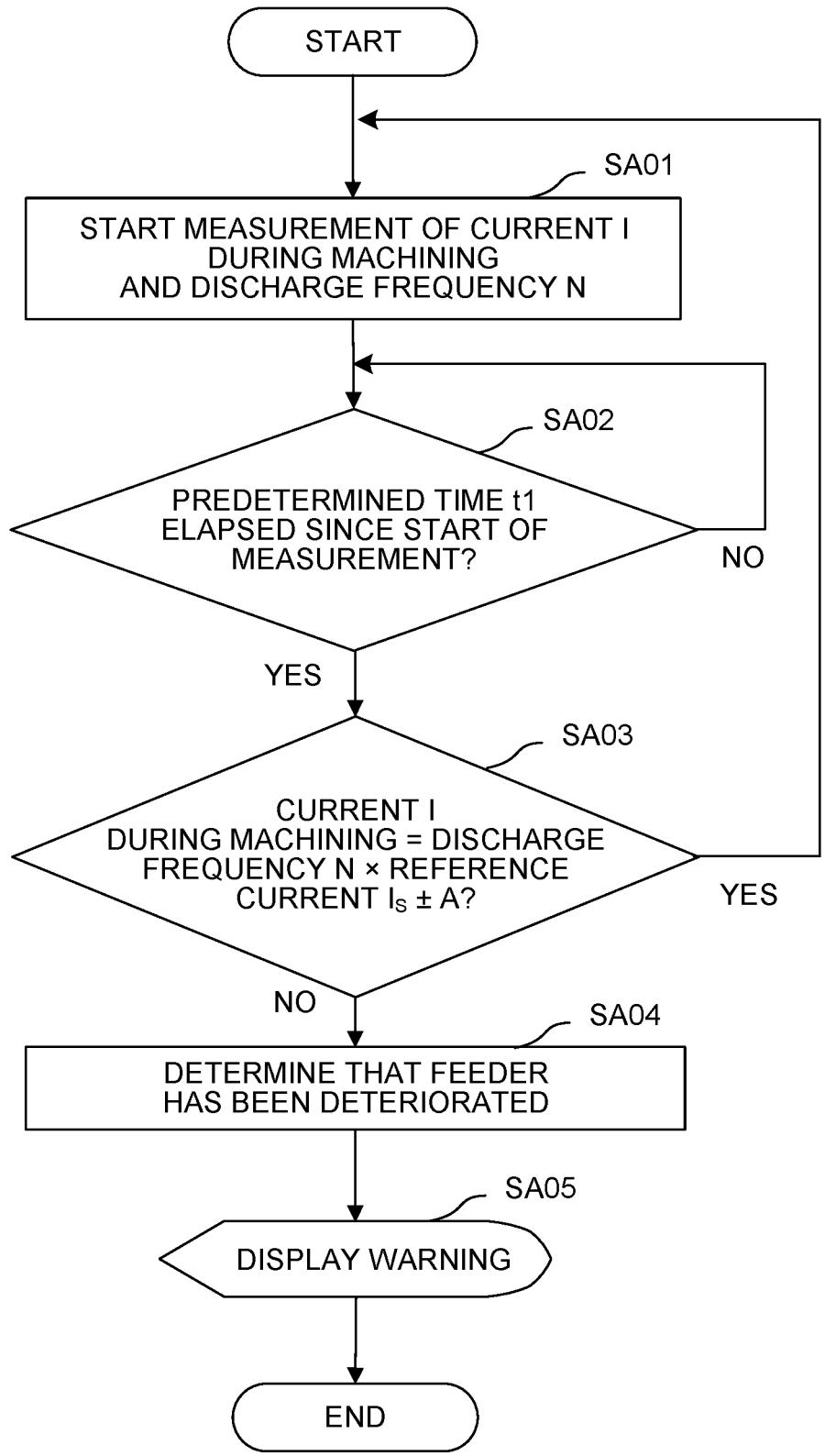
FIG. 2 is a flowchart showing a flow of processing performed by the wire electrical discharge machine of FIG. 1.

FIG. 2 is a flowchart showing a flow of processing performed by the wire electrical discharge machine of FIG. 1. The description will be given in line with each step of the flowchart.

[Step SA01]

The numerical controller 21 controls the machining current detection unit 26 and the discharge frequency detection unit 27 to start measuring the average machining current I and the discharge frequency N.

[Step SA02]

The numerical controller 21 determines whether or not the predetermined time t1 has elapsed since the start of the measurement. If it is determined that the predetermined time t1 has elapsed, the processing proceeds to Step SA03. If not, the measurement of the average machining current I and the discharge frequency N is repeated.

[Step SA03]

Based on the results of the arithmetic processing by the operation unit 22 and the comparison processing by the comparison unit 24, the determination unit 25 determines whether or not the integral value of the current I during the machining falls within the range of $N \times I_s \pm A$ (where N is discharge frequency, $I_s$ is reference current, and A is a margin). If the integral value falls within the range of $N \times I_s \pm A$, it is determined that there is no abnormality, whereupon the processing proceeds to Step SA01 for the next measurement. If not, it is determined that there is abnormality, whereupon the processing proceeds to Step SA04.

[Step SA04]

The determination unit 25 determines that the feeder 5 is deteriorated or broken.

[Step SA05]

The determination unit 25 displays a warning to the effect that the feeder 5 is abnormal on a display device of the numerical controller 21. The warning may be notified by a sound or lamp.

Figure 3:
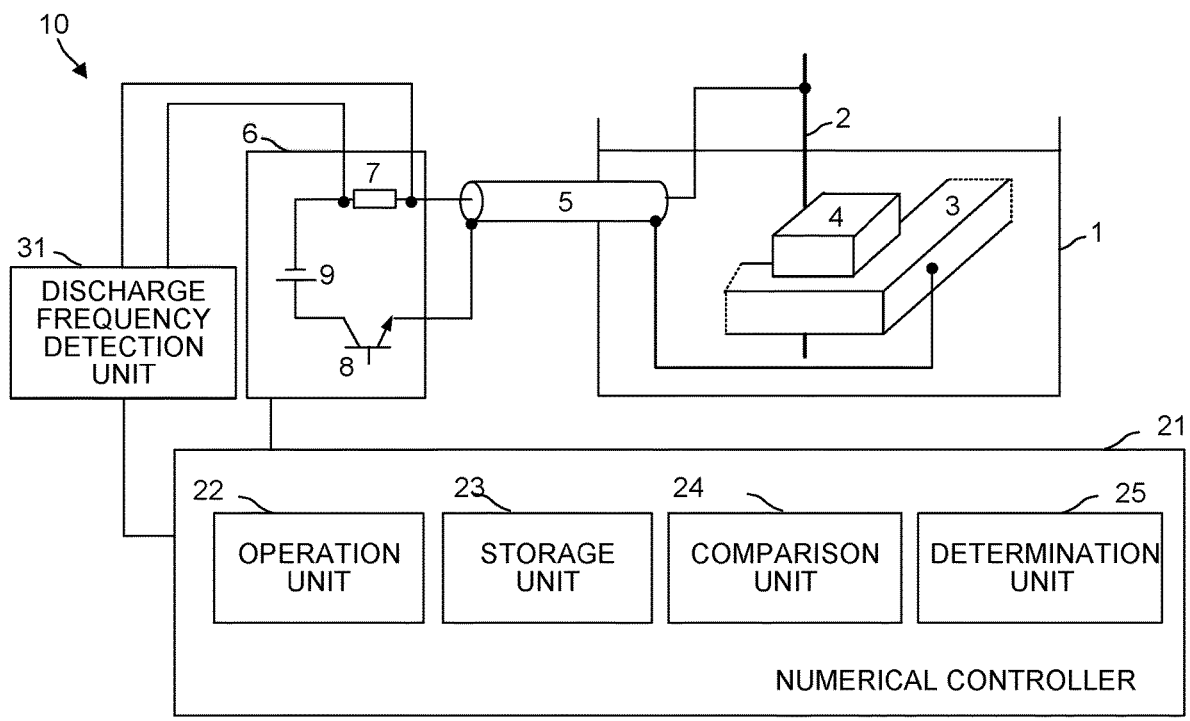
FIG. 3 is a schematic configuration diagram of a wire electrical discharge machine according to a second embodiment of the present invention.

FIG. 3 is a schematic configuration diagram of a wire electrical discharge machine according to a second embodiment of the present invention.

A wire electrical discharge machine 10 of the present embodiment is an equivalent of the prior art wire electrical discharge machine 10 shown in FIG. 7 to which a numerical controller 21 and a resistance voltage detection unit 31 are added. The numerical controller 21 comprises an operation unit 22, storage unit 23, comparison unit 24, and determination unit 25. In the present embodiment, the numerical controller 21 and the resistance voltage detection unit 31 constitute a feeder deterioration detection unit.

The wire electrical discharge machine 10 of the present embodiment, like the conventional one, performs electrical discharge machining by applying a voltage from a machining power supply 6 to a wire electrode 2 and a workpiece 4 on a table 3 through a feeder 5, in a machining tank 1. The machining power supply 6 comprises a resistive element 7, switching element 8, and DC power supply 9.

The resistance voltage detection unit 31 detects the value of a voltage applied to the resistive element 7 that is connected in series with a system comprising the DC power supply 9, the feeder 5, and a machining gap.

Figure 4:
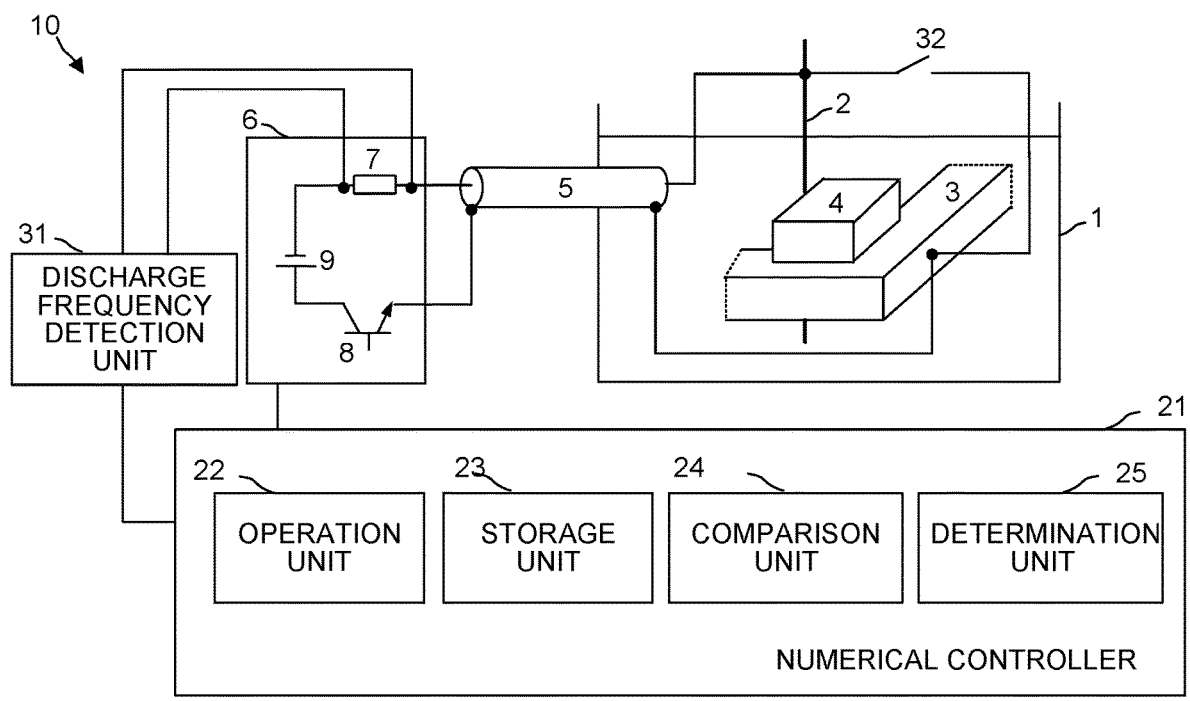
FIG. 4 is a schematic configuration diagram showing a case in which a relay is used as a short-circuiting means for a machining gap in the wire electrical discharge machine of FIG. 3.

The numerical controller 21 of the present embodiment first performs control for short-circuiting the machining gap when detection processing for the state of deterioration of the feeder 5 is started. Methods for short-circuiting the machining gap include a method in which the wire electrode 2 and the workpiece 4 are brought into contact with each other and a method in which a relay 32 is provided between the wire electrode 2 and the table 3 so that the machining gap can be short-circuited by closing the relay 32, as shown in FIG. 4.

Figure 5:
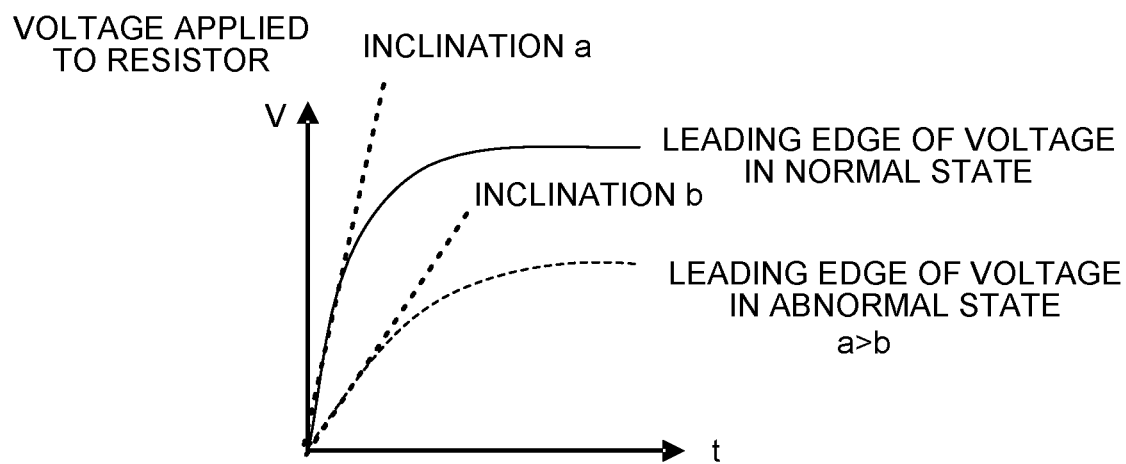
FIG. 5 is a graph showing the leading edge of a voltage applied to a resistive element in the wire electrical discharge machine of FIG. 4.

The numerical controller 21 controls the machining power supply 6 to apply a voltage to the machining gap after the machining gap is short-circuited and controls the resistance voltage detection unit 31 to detect the leading edge of the value of the voltage applied to the resistive element 7 that is connected in series with the system comprising the DC power supply 9, feeder 5, and machining gap. The graph of FIG. 5 shows the leading edge of the voltage applied to the resistive element 7.

In the storage unit 23 of the numerical controller 21 of the present embodiment, a reference value a is stored as an inclination value of the leading edge of the voltage applied to the resistive element 7 when the machining gap is short-circuited with the feeder 5 in a normal state.

The operation unit 22 calculates the inclination of the leading edge of the voltage detected by the resistance voltage detection unit 31. Moreover, the comparison unit 24 compares the inclination of the leading edge of the voltage detected by the resistance voltage detection unit 31, calculated by the operation unit 22, with the reference value a stored in the storage unit 23. If the result of the comparison by the comparison unit 24 indicates that the inclination of the leading edge of the voltage detected by the resistance voltage detection unit 31 is smaller than the reference value a, the resistance and inductance values of the feeder 5 can be considered to have been increased. Therefore, the determination unit 25 determines that the feeder 5 is abnormal and issues a warning to this effect.

Figure 6:
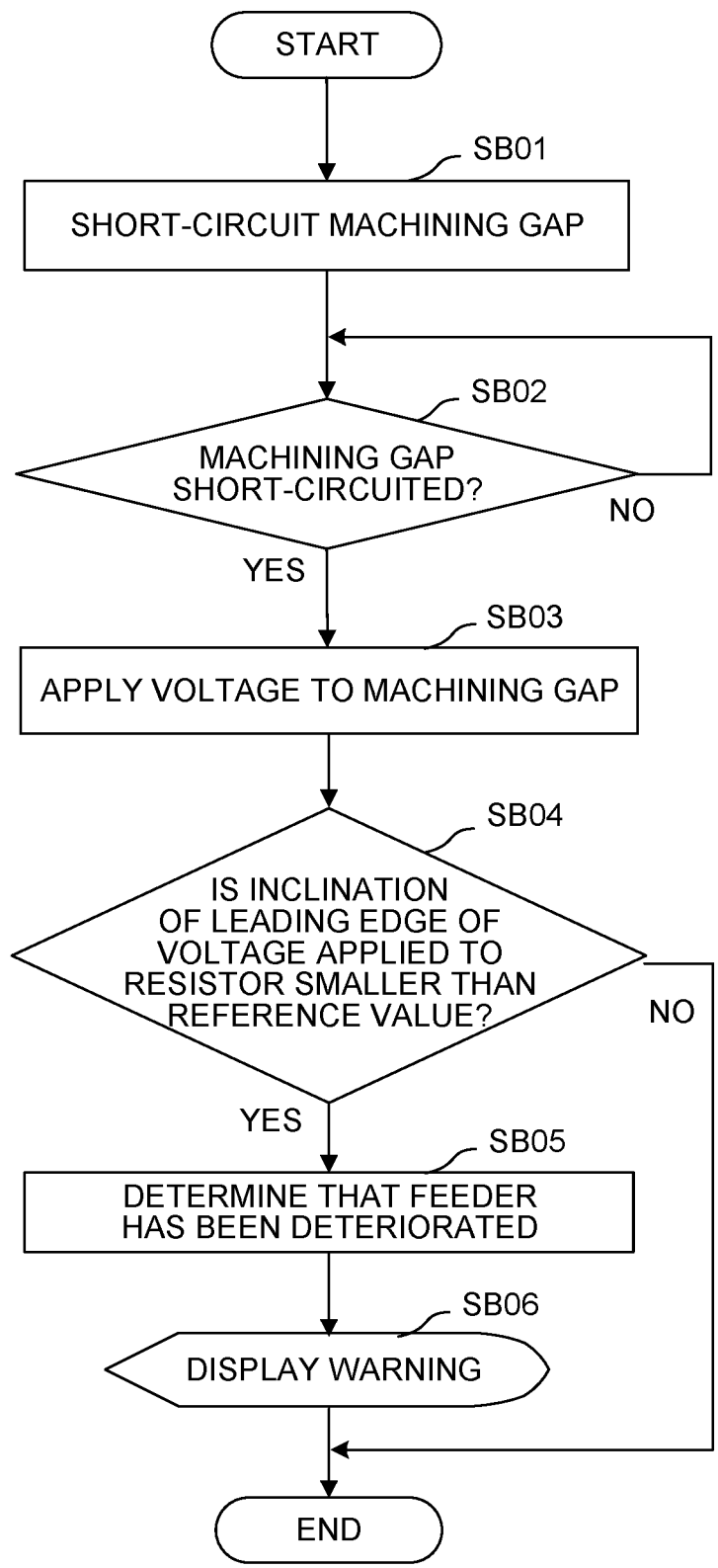
FIG. 6 is a flowchart showing a flow of processing performed by the wire electrical discharge machine of FIG. 3 (and FIG. 4)

FIG. 6 is a flowchart showing a flow of processing performed by the wire electrical discharge machine of FIG. 3 (and FIG. 4). The description will be given in line with each step of the flowchart.

[Step SB01]

The numerical controller 21 controls the wire electrical discharge machine 10 to short-circuit the machining gap between wire electrode 2 and the workpiece 4.

[Step SB02]

The numerical controller 21 determines whether or not the machining gap is short-circuited. If the machining gap is short-circuited, the processing proceeds to Step SB03. If not, this step is repeated until the machining gap is short-circuited.

[Step SB03]

The numerical controller 21 controls the machining power supply 6 to apply a voltage to the machining gap and controls the resistance voltage detection unit 31 to detect the leading edge of the voltage applied to the resistive element 7.

[Step SB04]

Based on the inclination of the leading edge of the voltage applied to the resistive element 7, which is calculated by the operation unit 22 and detected in Step SB03, and the result of the comparison by the comparison unit 24 based on the reference value a stored in the storage unit 23, the determination unit 25 determines whether or not the inclination of the leading edge of the voltage applied to the resistive element 7 is smaller than the reference value. If the inclination is not smaller than the reference value, it is determined that there is no abnormality, whereupon this processing ends. If the inclination is smaller than the reference value, it is determined that there is abnormality, whereupon the processing proceeds to Step SB05.

[Step SB05]

The determination unit 25 determines that the feeder 5 is deteriorated or broken.

[Step SB06]

The determination unit 25 displays a warning to the effect that the feeder 5 is abnormal on a display device of the numerical controller 21 or the like. The warning may be notified by a sound or lamp.

While embodiments of the present invention have been described herein, the invention is not limited to the above-described embodiments and may be suitably modified and embodied in various forms.

The invention claimed is:

1. A wire electrical discharge machine which performs removal machining of a workpiece by applying a voltage to a machining gap between a wire electrode and the workpiece through a feeder to generate electrical discharge, the wire electrical discharge machine comprising:

a feeder deterioration detection unit configured to detect deterioration of the feeder, wherein the feeder deterioration detection unit configured to detect deterioration of the feeder comprises:

a storage unit in which a data table loaded with a current value for each electrical discharge is stored;

a machining current detector configured to detect a machining current value during the machining; and a discharge frequency detector configured to detect the number of electrical discharges during the machining, wherein the deterioration of the feeder is detected based on the result of comparison between the machining current value detected by the machining current detector and the product of the number of electrical discharges detected by the discharge frequency detector and the current value for each electrical discharge loaded in the data table.

2. A wire electrical discharge machine which performs removal machining of a workpiece by applying a voltage to a machining gap between a wire electrode and the workpiece through a feeder to generate electrical discharge, the wire electrical discharge machine comprising:

a feeder deterioration detection unit configured to detect deterioration of the feeder, wherein, the feeder deterioration detection unit configured to detect deterioration of the feeder comprises:

a resistance voltage detector configured to detect an inclination of a voltage applied to a resistor connected in series with the machining gap and the feeder, and a storage unit in which a data table preloaded with a reference value for the inclination of the voltage applied to the resistor is stored, the reference value being the inclination of the voltage applied to the resistor when the machining gap is short-circuited with the feeder in a normal state, wherein the deterioration of the feeder is detected if the inclination of the voltage currently applied to the resistor with the machining gap short-circuited is smaller than the reference value loaded in the data table.

3. The wire electrical discharge machine according to claim 1, wherein a warning is issued in response to the deterioration of the feeder detected by the feeder deterioration detection unit.

4. A wire electrical discharge machine for performing removal machining of a workpiece by applying a voltage to a machining gap between a wire electrode and the workpiece through a feeder to generate electrical discharge, the wire electrical discharge machine comprising:
  a machining current detector configured to detect a machining current value during the machining;
  a discharge frequency detector configured to detect a number of electrical discharges during the machining; and
  a numerical controller configured to
    store a data table loaded with a reference current value for each electrical discharge, and
    detect deterioration of the feeder based on a result of comparison between (1) the machining current value detected by the machining current detector and (2) the product of (a) the number of electrical discharges detected by the discharge frequency detector and (b) the reference current value for each electrical discharge loaded in the stored data table.

5. The wire electrical discharge machine according to claim 4, wherein
  the numerical controller is configured to issue a warning in response to detection of the deterioration of the feeder.

6. The wire electrical discharge machine according to claim 1, wherein the feeder deterioration detection unit is further configured to:
  perform the comparison using the following expression:

$$N \times I_s - A < I_{t1} < N \times I_s + A$$

where
    $I_{t1}$ denotes an integral value of a current having flowed through the feeder during a predetermined time t1, the integral value $I_{t1}$ being determined based on an average of the machining current value detected during the predetermined time $t_1$ by the machining current detector,
    N denotes a discharge frequency which is the number of electrical discharges detected by the discharge frequency detector during the predetermined time t1,
    $I_s$ denotes a reference current corresponding to a machining condition at the time of detection of the current value loaded in the data table stored in the storage unit, and
    A is a margin value,
  determine that the feeder is not abnormal, in response to the expression being satisfied when the machining current value or the integral value $I_{t1}$ is determined to be substantially equal to the product of the discharge frequency N and the reference current $I_s$, and
  determine that the feeder is abnormal and issue a warning, in response to the expression being not satisfied when the machining current value or the integral value $I_{t1}$ is deviated from the product of the discharge frequency N and the reference current $I_s$.

* * * * *